(12) United States Patent
Jung et al.

(10) Patent No.: US 6,170,531 B1
(45) Date of Patent: Jan. 9, 2001

(54) FLEXIBLE TUBULAR LINING MATERIAL

(75) Inventors: Harald Jung, Kreimbach (DE); Hans Bunschi, Rüti (CH); Heinz Scheib, Kappeln (DE)

(73) Assignee: Karl Otto Braun KG, Wolfstein (DE)

( * ) Notice: Under 35 U.S.C. 154(b), the term of this patent shall be extended for 0 days.

(21) Appl. No.: 09/071,392

(22) Filed: May 1, 1998

(30) Foreign Application Priority Data

May 2, 1997 (DE) .............................. 197 18 655

(51) Int. Cl.$^7$ .................................. F16L 55/163
(52) U.S. Cl. ..................... 138/98; 138/97; 156/287; 264/267; 405/150.1
(58) Field of Search .................. 138/97, 98; 156/287; 264/267; 405/150.1

(56) References Cited

U.S. PATENT DOCUMENTS

| | | | |
|---|---|---|---|
| 4,576,205 | * 3/1986 | Morinaga et al. | 138/98 |
| 4,647,072 | * 3/1987 | Westman | 138/97 |
| 4,684,556 | 8/1987 | Ohsuga et al. . | |
| 4,752,511 | * 6/1988 | Driver | 138/98 |
| 4,758,454 | * 7/1988 | Wood | 138/98 |
| 4,836,715 | * 6/1989 | Wood | 138/98 |
| 4,897,911 | * 2/1990 | Keldany et al. | 138/97 |
| 5,280,811 | * 1/1994 | Catallo et al. | 138/97 |
| 5,501,248 | 3/1996 | Kiest, Jr. | 138/98 |
| 5,535,786 | * 7/1996 | Mäkelä et al. | 138/98 |
| 5,566,719 | * 10/1996 | Kamiyama et al. | 138/97 |
| 5,634,743 | * 6/1997 | Chandler | 138/98 |
| 5,692,543 | * 12/1997 | Wood | 138/97 |
| 5,857,494 | * 1/1999 | Tsukamoto et al. | 138/98 |

FOREIGN PATENT DOCUMENTS 3505107  8/1985 (DE).
0127102  12/1984 (EP).

* cited by examiner

*Primary Examiner*—James Hook
(74) *Attorney, Agent, or Firm*—Fitch, Even, Tabin & Flannery

(57) ABSTRACT

The invention relates to a flexible tubular lining material which comprises a seamless plush textile tube and a plastic film layer arranged coaxially and freely around it as well as a method for the production of conduit and/or pipe linings which comprises impregnation of the flexible tubular lining material with a curable resin composition, the introduction of the impregnated material into an inversion tube, the subsequent pressing of this arrangement into the conduit or pipe section to be lined and the curing of the resin under maintenance of applied pressure in the inversion tube.

24 Claims, 1 Drawing Sheet

FLEXIBLE TUBULAR LINING MATERIAL

The invention relates to a flexible tubular lining material, especially a flexible tubular lining material for conduits and/or pipelines (hereinafter abbreviated as pipelines) in need of rehabilitation, a method for the production of a pipe lining, a pipe lining produced from the lining material as well as the use of the lining material for their production.

BACKGROUND OF THE INVENTION

In the rehabilitation of covered laid conduits and pipelines, especially house conduits with small pipe diameter, for example in walls or underground, rehabilitation by removal and exchange of the defective partial section is an extensive and cost intensive measure. The excavation and work to free the pipes associated with this are time and cost intensive, are frequently difficult to perform and require particular measures to protect against dirt, especially with work carried out in buildings. Additionally, construction sites resulting from this represent a potential source of danger and a inconvenience to the surroundings. For this reason, there exists a great need for alternative constructional methods which allow for a lining of pipelines without having to expose the pipelines thereby and, if need be, without having to remove and exchange the pipeline portions.

To date, various non-invasive methods for pipe lining are known as well as various materials which are used for this purpose.

To improve damage at points in impassable pipelines, resin-impregnated laminate sleeves are used which consist of glass cloth impregnated with a cold-hardening resin for example. The glass fiber mats impregnated with resin and cut to the desired dimension are provided with separation foil and wrapped around a packer that is capable of being introduced into the pipe which is then inserted into the pipe. This device is positioned at the damaged spot and pressurized such that the resin-impregnated glass cloth is pressed closely against the pipe and cures there. After curing of the resin, the introducing device is removed again from the pipe and a resin/glass fiber composite sleeve remains in the pipeline.

A system is known for lining longer pipe sections which consists of a polyester, needled felt flexible tube, a two-component epoxy with which the felt tube is impregnated and a silicone calibrating tube. The calibrating tube in pre-determined length is inserted into the needled felt tube and closed at the end. After impregnation of the needled felt tube with epoxy, the system is inserted into the pipeline by means of a cable winch. Then, the calibrating tube is pressurized with air whereby the impregnated felt tube is pressed closely against the pipeline. After curing of the resin, the pressure is released and the calibrating tube is removed, and a felt/resin composite pipe remains in the pipeline.

This system is primarily suitable for lining of house connection pipelines in which both pipe ends are well accessible. It is not useable for pipelines which do not allow the tubular system to be pulled through, and, additionally, it requires a very circumspect method of working because the epoxy resin is applied on the outside of the needled felt tube. Furthermore, the system is not suitable for crease-free rehabilitation of pipelines with bends of more than 67°.

In a different method, a system is employed which consists of a woven tube with a glass/felt/glass sandwich construction which is impregnated with a light-curing UP resin, a highly flexible inner foil and an outer foil which is impermeable to styrene and UV. This system (liner) is pre-fabricated in the factory in accordance to the diameter and length of the pipeline to be lined and inserted in the pipeline from existing shafts. Then, a further foil is pressed into the pipe by means of air pressure in an inversion method whereby the inserted liner is pressed against the pipe wall. The resin/ woven tube system pressed in this manner is irradiated and cured with UV light from previously mounted packers equipped with UV lamps.

This system is also not suited for pipes with sharply angled bends of 90° for example. Furthermore, the possibility must also exist here to pull the resin-impregnated woven tube through by means of a winch and the removal of the inner foil after curing of the resin requires an additional work step.

Additionally, the lining materials described above have the disadvantage that they have a seam in the lengthwise direction along which the originally flat material is bound to a flexible tubular form. This seam represents a potential point of fracture at which a detachment of the lining can begin and which can lead to the formation of creases.

A flexible tubular lining material for pipelines which can contain bends and curved sections is disclosed in DE 35 05 107. This lining material consists of a flexible tubular knitted or woven textile jacket that is coated with an air-impermeable coating of a flexible synthetic resin. For lining a pipe, this lining material is introduced into the pipe under applied pressure in an inversion method such that the textile side comes to lie against the inner wall of the pipe and the synthetic resin coating forms the most inward layer of the lined pipe. The textile layer is adhesively bonded with the outlying pipe with a binder previously introduced in the lining material.

The textile jacket is a compact, non-compressible woven fabric or knitted fabric of curly polybutylene terephthalate fibers (warp thread) and other synthetic fibers (weft thread). The textile jacket as well as the synthetic resin used for its coating is biaxially stretchable whereby adaptation of the lining material to the form of the pipeline occurs, especially in bends and curved sections, with application of pressure to the lining material introduced into the pipe. Formation of creases should be avoided thereby.

However, intensive experimental studies of the inventor have resulted in the fact that a lining of complicated pipe sections, such as bends of 900 for example, cannot be obtained in a satisfactory, crease-free manner with a lining material of a biaxially stretchable textile jacket which is coated with a flexible synthetic resin. Rather, a composite of this type leads to the formation of creases in the inner bend in the region of sharp bends such as 90° and/or to detachment of the lining material from the inner wall of the pipe in the outer bend. Hence, this problem could not be satisfactorily solved.

As a consequence, the object of the invention is to develop a lining material which is suitable for crease-free lining of pipelines in need of rehabilitation that have a complicated structure, especially bends of up to 90°, changes in the pipe inner diameter along the pipeline to be lined or complex portions with complicated geometry in the region of branched connections.

Furthermore, a method is provided that makes the production of a pipe lining possible in an easy, clean and cost effective manner.

DETAILED DESCRIPTION

In direct connection with this, a further object of the present invention is to provide a pipe lining which has excellent sealing properties and load-bearing capacity and fits closely to the lined pipe in all regions without separating from this and without forming creases.

SUMMARY OF THE INVENTION

The above objects are solved according to the invention by providing a lining material comprising a plush textile tube and a foil tube as defined in claim 1 as well as by providing the pipe lining as it is defined in claim 24 and the method for its production as defined in claim 14.

A new lining material as well as a new pipe lining particularly for the field of public as well as private pipeline rehabilitation can be provided by this surprising manufacturing technology solution which not only represents a subtle distinction over the state of the art but which also considerably furthers this by the following advantages:

providing a lining material which fits closely and can also be installed crease-free in complicated pipeline systems.

production of a pipe which is completely seam-free and joint-free from the basement to the main conduit, independent of bends and lateral connections.

abolishment of the requirements of easy accessibility of the ends of the pipe sections to be rehabilitated.

easy handling of the lining material with respect to the preparation and introduction into the damaged pipeline which allows the pipe lining to be carried out even under spatially confined circumstances.

very clean performance of the pipe rehabilitation which also permits work in buildings.

Figure 1:
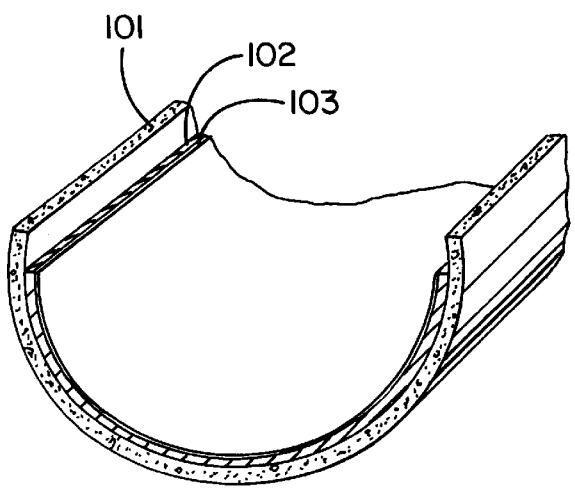
FIG. 1 shows an old conduit or pipeline 101 in need of rehabilitation together with a new tube 102 provided therein comprising a seamless plush textile tube and resin and a foil tube 103.
Figure 3A:
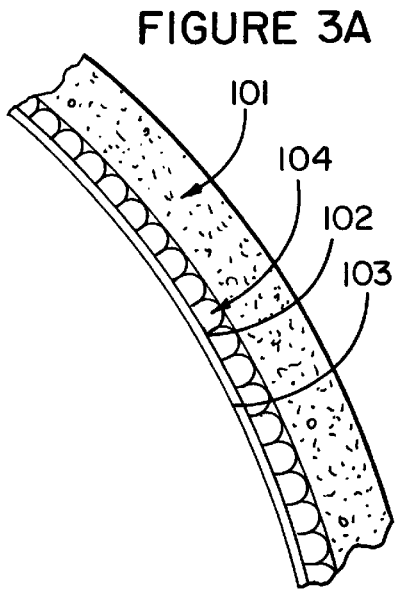
FIG. 3 shows a cross section of rehabilitation pipe with an enlarged section showing the orientation of the loop of the textile material. In the following, the lining material according to the invention, the pipe lining and the method for their production are described in detail and subsequently further illustrated by means of concrete examples.
Figure 3:
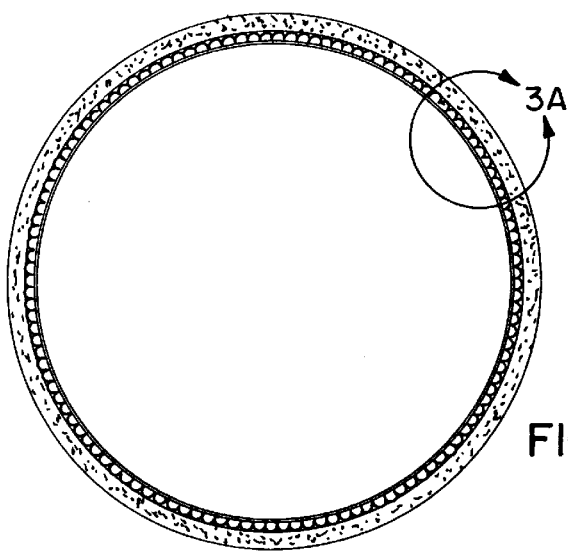
Figure 2:
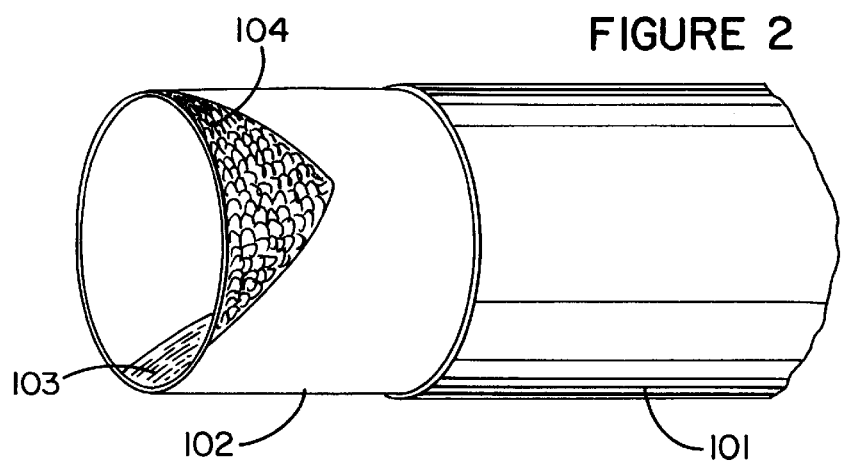
FIG. 2 is a perspective view of an old conduit or pipeline 101 in need of rehabilitation showing a new conduit/pipeline 102 provided therein comprising a seamless plush textile tube and resin and a foil tube 103. A peeled back section of pipe shows an enlarged view of deformable loops 104 of the textile which press against the inner wall of the conduit 102.

The lining material according to the invention comprises a seamless plush textile tube (designated in the following as a textile tube) and a foil tube arranged coaxially and freely around it.

The textile tube is a seamless, circular knit plush produced by a circular knit method. This is understood as a circular knitted knitware in which strips of yarn (loop) protrude from one or two sides from the core of the ware. By suitable selection of the knitting parameters, the mechanical properties of the textile tube required for attaining the effect according to the invention can be adjusted for the respective fiber starting material used. A detailed description of the technical aspects of plush production is described for example in "Circular Knitting", Iyer-Mammel-Schach, Theory and Practice of Knitting Technology, Meisenbach, Bamberg (1991).

Any synthetic fiber materials can be used as fiber materials for the textile tube as long as they have a sufficient resistance against the surrounding medium of the device for which the lining material is to be used for lining.

Preferable fiber materials are polyester, polyester (high-strength), aramide, polyamide, kevlar, polyurethane (PU) as well as glass fibers. Additionally, mixtures of these materials can be used, for example a combination of polyester core fibers with glass fibers for the plush loop, or loop fibers of polyester in combination with core fibers of aramide, polyamide, polyurethane.

Additionally, two or more different fiber materials can be used for the loop and/or the core of the ware. When using the same fiber classes (for example polyester or polyamide) for the core- and loop fibers, it is not necessary that these be identical to each other, i.e. different polyester fibers can be used for the loop and/or the core of the ware which can differ for example with respect to their composition, fiber thickness and other typical fiber parameters. Particularly preferred fibers for the plush textile tube are polyester fibers and polyester (high-strength) fibers.

In order that a lining can be produced from the lining material according to the invention which has preferred dimensional and mechanical properties, it is desirable that the textile tube fulfills certain requirements with respect to the knit density, tube thickness and the material distribution so as to obtain the preferred flexibility in the longitudinal and transverse direction as well as the compressibility of the textile tube.

The compressibility is characteristic of the change of the density of an individual textile tube layer that is obtained between two rigid surfaces by application of a compression pressure to this layer. According to the invention, the textile tube preferably has a compressibility which corresponds to a reduction of the density of an individual layer of 5–60% of the non-compressed density when a layer of the textile tube is compressed between two rigid surfaces with a compression force of 0.4–0.8 bar.

The compressibility is determined to a good degree by the ratio of the relatively weakly compressible core of the ware to the essentially more easily compressible strips of fiber (loops) which protrude therefrom. According to the invention, the preferred ratio of the amounts of material of core to loop, with respect to weight, lies in the range of 1:99 to 25:75, more preferably 2:98 to 20:80 and especially 2:98 to 15:85.

The number of rows of stitches in the textile tube is not particularly limited and, as a function of the fiber material used and the mechanical properties to be obtained, can preferably lie in the range of 30 to 80 rows of stitches (RS)/10 cm, more preferably in the range of 35 to 70 RS/10 cm and especially from 38 to 60 RS/10 cm.

The simple tube thickness is to be determined as a function of the desired wall thickness of the lining to be produced from the lining material. For typical application purposes, such as the lining of pipelines with an inner diameter of 80 to 300 mm for example, tube thicknesses in the range of 2 to 10 mm in the non-compressed state are generally suitable. However, for special application purposes, the tube thickness can also take on larger values. According to the invention, tube thicknesses in the range of 3 to 8 mm, especially from 4 to 6 mm, are preferred.

A preferred feature according to the invention is the biaxial flexibility of the textile tube in the axial as well as radial direction, preferably in a ratio of axial/radial of about 1:3 to 1:5. As a result of this property, the effect can be obtained in the production of a lining with the lining material according to the invention that the lining always sits on the lined device independent of whether the radius along the lined section changes, bends occur, inlets or outlets are present and/or non-removable small obstructions or obstructions which are only difficult to remove remain in the region to be lined.

The flexibility in the longitudinal direction preferably amounts to 10 to 70%, particularly preferably 20 to 55w. In the transverse direction, the flexibility is distinctly higher and preferably lies in the range of 50 to 200%, particularly preferably 70 to 150%. The flexibility in the longitudinal and transverse direction can be adjusted in a manner known to the skilled person by selection of the knit parameters and by a suitable selection of the amounts, thicknesses and ratios of the material to be knitted.

A method is preferably applied in the production of a lining of the lining material according to the invention in which the lining material is introduced in the space to be lined under applied pressure in an inversion tube whereby the lining material is inverted from the inner position to the outer position and is pressed onto the wall of the space to be lined.

With respect to the pressing and holding pressure required for the inversion method, it is preferred that the flexibility of the textile tube is of a predominantly plastic nature and only contains a portion of elastic flexibility which is not too high. As a result, after the lining material has been pressed in and pressed on the space to be lined, the holding pressure during the curing time of the resin described below can be reduced without leading to detachment of the introduced material-based on elastic recovery forces in the extended textile tube. Preferably, the textile tube has an elastic recovery according to DIN 61632 (German Industry Norm) in the transverse as in the longitudinal direction of 60% or less, more preferably of 40% or less.

The flexibility of the textile tube is preferably adjusted such that, on the one hand, it is ensured that bends of 90° can be lined so that the textile tube is always fitted closely to the wall but, on the other hand, it is not squeezed out of the end opening which can lead to detachment of the lining from the wall. Since this effect is primarily dependent on the flexibility in the longitudinal direction, the values of this parameter preferably lie in the region given above.

As a result of the preferred combination according to the invention of the compressibility and flexibility (expandability) values described above, the additional advantageous effect is obtained in the production of pipe linings in the region of lateral branches that the material is pressed into the branching pipeline to a certain degree whereby the material applied in the direct vicinity of the butting of the pipes is thinner than in the remaining lined space. Thereby, quasi-seamless transitions from one line into the other can be achieved more easily in the following steps.

The foil tube which, together with the textile tube, represents the essential components of the lining material according to the invention, has an inner diameter that allows the textile tube to be freely introduced into this. Since the lining material is inverted from inside to outside in the production of a lining using the lining material, it is not necessary that the textile tube fit into the foil tube without creasing.

In the production of a lining of the lining material according to the invention, the foil tube forms the layer which stands in direct contact to the lined space. Hence, it is preferred that it is resistant against the medium with which it comes into contact. This includes chemical resistance with respect to the substances passing through the lined space as well as abrasion resistance against transported solid particles and temperature resistance within the region designated for the respective application purpose.

Furthermore, it is preferred according to the invention that the foil tube as well as the textile tube of the lining material according to the invention has a temperature resistance of 80° C. or above, more particularly 100° C. or above.

Additionally, it is preferred according to the invention that the foil tube itself has a sealing function. Hence, it is preferred that, depending on the application purpose, the foil tube has the lowest possible gas and/or liquid permeability, especially water permeability.

The material for the foil tube is not particularly limited as long as the properties described above can be fulfilled and, additionally, the foil tube is acceptable from an ecological point of view.

As explained below in more detail, a limiting condition in one of the preferred embodiments is that the foil tube is compatible with the curable resin composition which is employed as an impregnating agent in the method described below and is generally employed for the production of the lining according to the invention and binds with this as an adhesive unit.

Since the foil tube in the lining produced from the lining material according to the invention remains as the inner most layer of the lined device, for example a conduit or pipe, it is desirable that the resin reacts with the tube in such a manner that a firmly sealed laminate of the tube and the cured resin exists after curing. Otherwise, the danger can arise that the foil tube detaches from the cured resin and, as a result, subsequent formation of creases and obstructions in the lined hollow space can occur.

On the other hand, it is advantageous when the foil tube is resistant enough with respect to the curable resin composition that it is not dissolved and destroyed during the curing phase of the resin composition. For this, the skilled person selects the material and material thickness of the foil tube preferably under the simultaneous consideration of the resin composition intended for the impregnation of the textile tube.

Considering the typically resin compositions useable as impregnation agents, materials such as polyester, polyurethane and polyester urethane are preferred for the foil tube. For particular application purposes, tube foils of silicone resin can also be suitable.

The thickness of the foil tube can be selected as a function of the desired sealing properties, the compatibility with the curable resin composition to be used and the required strength for the expansion of the foil tube. In general, foil tube thicknesses of 50 to 250 $\mu$m are preferred, especially 80 to 200 $\mu$m.

It is equally preferred as described in connection with the textile tube that the foil tube also has a flexibility in the longitudinal as well as in the transverse direction. Generally, materials suitable for the foil tube have flexibilities which distinctly lie above the flexibility values of the textile tube such that this property itself does not represent a critical criterion of the present invention. However, it is advantageous when, for the same reasons as described above, the flexibility does not have a high portion of elastic flexibility which is too high. Preferably, the return according to DIN 61632 (German Industry Norm) in the transverse as well as the longitudinal direction is 60% or less, more preferably 40% or less.

With respect to the force required for extending the foil tube, it is preferred that this does not exceed a certain maximum value so that the inverting and holding pressure required for the preferred inversion method employed for production of a lining is not too high. Therefore, it is preferred that the force which is necessary for extending a single-layered foil tube material by 40% does not exceed an amount of 10 N/cm.

The method according to the invention is a method for the production of a pipe lining in which the lining material according to the invention is employed. More precisely, it encompasses
a) impregnating a lining material according to the invention as described above in a suitable longitudinal and diameter sizing for the intended individual application with a curable resin composition (impregnation agent),
b) introducing the impregnated lining material of step a) into an inversion pressure tube,
c) pressing the arrangement of step b) into the pipe section to be lined by means of a pressure-driven inversion method and
d) curing the impregnation agent under maintenance of a pressure in the inversion tube which ensures the contact of the impregnated lining material to the wall of the pipe section.

According to this method, linings can be produced which fit closely and crease-free in all regions on the wall of the lined void space; also in critical regions such as bends of up to 900, in regions in which the diameter of the lined void space is narrowed down or widened as well as in the region of branches or joining lateral lines. The method is particularly suitable for lining conduits and pipes with a inner diameter of 80 to 400 mm, especially of 100 to 250 mm.

For obtaining particularly advantageous results, it is preferred that the lining material employed in the above method is sized such that the non-flexed textile tube and the non-flexed foil tube each has a diameter that is smaller than the inner diameter of the lining obtained in step d).

For the wall thickness of the lining produced according to the method according to the invention, it is preferred that this, as a function of its diameter, lies in the range of ca. 2 to 8 mm, more preferably at 3 to 7 mm.

From static model calculations under assumption of a safety level of $\geq 2$, a transport load of 30 t as it approximately exists in the region of the junction of house canalization into the main conduit under the street, a groundwater cover of the line of 1 m and a long-term E module of 1200 N/mm$^2$ (expected value after 50 years), a required wall thickness, linearly dependent on the diameter, of 2 to 4 mm results for the lining of pipelines with an inner diameter of 100 to 200 mm.

However, with linings in regions in which static considerations are less critical, such as in pipelines laid in buildings for example, the obtained wall thicknesses can also be lower as long as the required sealing and other properties are achieved.

According to the invention, it is altogether preferred in accordance with the above embodiments, considering the static requirements on the one hand and smallest possible reduction of the pipe cross sectional area on the other hand, that the wall thickness of the produced lining within the diameter range of 80 to 400 mm lies in the range of ca. 2% of the pipe inner diameter.

It is preferred in the method according to the invention, and as is frequently required when performing this under realistic conditions, that the pipeline piece to be lined is cleaned and freed from obstructions such as, for example, projecting inlets, ingrown roots, largely displaced joints, sediments, etc. before the actual lining measures.

Further required preparative measures are the measurement of the length and the diameter of the pipeline to be lined and the calibration of possible feeders. Additionally, access to the sewer conduit must be assured in the lining of sewer pipes, whereby in the ideal case, shafts are present; however, in individual cases, preceding construction of a shaft can be necessary. In many cases, at least in the case of house pipeline linings, the installation can directly ensue from a suitable room of the building without having access to a shaft as an absolutely necessity.

It is preferred according to the invention, especially when the danger exists that water or other impurities from the outside can enter into the conduit or pipeline to be lined, that a suitable sealing material, for example a suitable foil tube (preliner), be introduced into the pipe section to be lined before carrying out the method according to the invention, however before step c) at the latest.

This measure further serves the purpose that the contamination of the surroundings of the pipeline to be lined with the impregnation agent employed in the method according to the invention can be excluded.

In the course of the preparation of the installation facilities required for the inversion method, including the monitoring elements (camera and/or pipe rehabilitation robot), the lining material according to the invention is cut to the desired length, the amount of the components necessary for the impregnation are calculated and the resin composition is correspondingly mixed together.

The curable resin composition to be used as the impregnation agent is not particularly limited as long as the following requirements and properties are fulfilled.

As already noted above, it is advantageous when the curable resin composition is selected as a function of the material of the foil tube of the lining material. According to the invention, preferred resin compositions are cold-curing epoxide resins, cold-curing unsaturated polyester resins (UP-resins), UV-curing UP-resins and PU-resins.

Examples of commercially obtainable resin compositions useable according to the invention are Beckopox®-EP 116 and -EP 117 (Hoechst AG, Frankfurt (preferably in combination with the special curing agents Beckopox®-VEH 2628, -EH 640 or -EH 641, Hoechst AG, Frankfurt), Concresive® APS 2200 (MBT Ceilcoat, Biebesheim), Alpolit®-UP 745 and -UP 746 (Vianova Resins GmbH, Mainz-Kastel) as well as Palatal®-resin (BASF AG, Ludwigshafen).

Considering process technology aspects, it is of advantage when on the one hand the resin is of sufficiently low viscosity such that before introduction of the lining material according to the invention into the pipeline to be lined it is tacky and at the same time can be filled into the pipeline to be lined. On the other hand, the viscosity should be sufficiently high so that the resin composition does not flow out into the lined pipeline during the curing process and thereby results in an unequal distribution of the resin and the formation of unequal wall thicknesses. Under this aspect, it is particularly preferred when the curable resin composition used has thixotropic properties.

Additionally, when using a cold-curing resin composition, it is required that the spreadable life adjusted when mixing the resin components is measured such that after mixing of the resin composition with the binding agent and further possible additives sufficient time still remains to introduce the resin composition evenly into the lining material and to introduce and align the material filled in this manner into the pipeline to be lined. Depending on the length of the pipeline to be lined and the amount of resin to be introduced into the lining material, the required spreadable life generally lies in the range of 30 minutes up to 2 hours. However, for particular application cases, spreadable lives can also be selected which distinctly fall below or go beyond this range.

When using UV-curable resin compositions, the processing time for the impregnation and mounting of the lining material is less critical as long as an appreciable UV irradiation of the resin composition can be effectively avoided. A particular advantage in this case is when the foil tube of the lining material according to the invention is impenetrable to UV light or at least strongly diminishes this.

When using cold-curing resin compositions, it can be necessary, especially with use outside of closed rooms, to adjust the spreadable time of the resin composition under consideration of the relative seasonal outside temperature. It is also conceivable that for certain temperature ranges pre-formulated resin compositions are used for carrying out the method according to the invention or pre-cooled resin compositions are used for prolonging the spreadable life.

The amount of resin composition to be introduced into the lining material according to the invention, with respect to a unit length of the lining material of 1 m, is dependent on the diameter of the pipeline to be lined and the desired wall thickness of the lining to be produced. As described above, it is preferred that the textile tube is so compressed in the conduit and/or pipeline lining according to the invention that the thickness of the compressed plush layer is reduced by 5 to 60% as compared to the non-compressed thickness. This corresponds, broadly estimated, to a preferred weight ratio of the amount of resin used to the weight of the textile tube of ca. 1:1 to 3:1.

Generally and as a rough guideline, a volume amount of resin composition which lies in the range of 75–200 volume % of the tightly packed but non-compressed lining material according to the invention is suitable for carrying out the method according to the invention and for the production of the lining according to the invention.

The cured resin should be provided in such a manner that no danger to the environment results from it, i.e. it is advantageous when the resin is environmentally indifferent under the conditions to be expected in the pipeline to be lined.

Furthermore, it is preferred when the resin is selected such that the cured resin composition fulfills the pressure resistance values and other mechanical stability values pre-determined for the individual application case.

Additionally, it is desirable, especially in the lining of pipelines which are exposed to high temperatures, that the resin is temperature resistant. Thus, it is preferred according to the invention that a resin is used which has a temperature resistance after curing of 80° or above, more preferably of 1000 or above.

To obtain further advantageous properties of the cured resin composition, further additive agents, aside from optionally required additives such as curing agents for example, can be added to the base composition. Fore example, photosensitizers can be added to increase the UV curing efficiency as well as deaerators to avoid gas bubble formation during curing (for example, from the "Byk®-A" series, BYK-Chemie, Wesel), netting and dispersing additives for adjusting the viscosity and flow properties (for example, from the "Byk®-W" series, BYK-Chemie, Wesel), shrink reducing additives such as Additol® 6228 (Vianova Resins GmbH, Mainz-Kastel) for example as well as crosslinking agents, colorants, pigments, inhibitors and fillers.

As already discussed above, it is advantageous and preferred according to the invention that the curable resin composition used as an impregnation agent reacts with the foil tube of the lining material according to the invention during curing in such a manner that the cured resin composition is firmly bound to the foil tube. As a result, the danger that the foil tube delaminates from the lining according to the invention is reduced.

Therefore, it is preferred to suitably select the resin composition for the impregnation and the foil tube of the lining material according to the invention under consideration of this aspect. The selection criteria required for this are known to the skilled person.

As already noted above, the ready-to-use prepared resin composition is filled into the lining material according to the invention and evenly distributed therein. This can advantageously occur by means of a roller system with adjustable slit width. After the filling and distribution of the resin composition and removal of air bubbles which are possibly present, one end of the resin impregnated lining material is closed, the entire unit is introduced into an inversion tube and the ends of the impregnated lining material and the inversion tube are fastened to an inversion limb in a known manner.

Subsequently, the inversion limb is introduced into the pipeline to be lined and the inversion limb is charged with air pressure. As a result, the impregnated lining material together with the inversion tube is pressed into the pipeline to be lined, whereby the resin impregnated textile tube comes to lie on the inner wall of the pipeline to be lined and/or on the sealing foil (preliner) which has been alternatively previously introduced. The speed of the inversion is preferably controlled by means of a camera from a camera lock on the inversion limb.

If bends exist in the pipeline to be lined, the shape of the bend can be supported by an applied pressure balloon which can be installed after the ensuing inversion at the desired place from a balloon lock on the inversion limb.

After successful, completed inversion and positioning of the lining material in the pipeline to be lined, pressure is maintained in the inversion tube until the curable resin composition is cured. The curing can be triggered and controlled by means of micro-robot equipped with a UV lamp (in the case of UV curable resin compositions) or by influx of warm air or warm water at a pre-determined temperature.

After curing of the resin composition, the inversion tube and the inversion limb are removed and the lining produced is examined for possible imperfections. Furthermore, the end knots as well as openings to side branches which are possibly present are milled out by means of a mini-robot.

In the lining of branched pipelines or in the junction of pipelines, these are each individually lined after each other and the connection of the linings to the branch points are subsequently post-treated and seamlessly bonded to each other with the aid of a mini-robot.

In a preferred embodiment according to the invention, the textile tube, the foil tube and/or the preliner is coated with copper by evaporation under vacuum or electrochemical coating. Thereby, the effect can be obtained that the growth of roots can be effectively prevented as a result of the growth inhibiting properties of copper on plants.

The lining materials according to the invention are applicable in a versatile manner for the production of linings, especially of conduit and pipe linings of public or private sewer systems. They are suitable for repairing and rehabilitating worn-out pipeline systems such as, for example, sewer lines, gas lines, exhaust lines and liquid transport lines and allow the provision of a closely fitting and crease-free lining of the respective system, even when this has geometrically difficult passages such as taperings or enlargements of the pipe diameter, bends of up to 90° or other irregularities. Particularly advantageous effects with the use of the lining material according to the invention come to light when the method according to the invention for their processing is applied for the production of the conduit and/or pipe linings. In the following, the present invention is further illustrated by means of concrete examplified embodiments.

EXAMPLE 1

A textile tube of polyester materials (core material PES 167 dtex f48x2 x2, loop material PES 550 dtex f96x1 x2) in a right/left linkage was produced which had 104 rows of stitches/ per circumference and 60 RS/ 10 cm. It had a flat width of 100 mm, a wall thickness of 4.0 mm and a weight of 860 g/running meter. The mechanical properties were as follows:

| | |
|---|---|
| flexibility, longitudinal (%) | 20 |
| flexibility, transverse (%) | 95 |
| return, longitudinal (%) | 45 |
| return, transverse (%) | 50 |
| compressibility (%) | 50 |
| tearing strength, longitudinal (N/cm) | 90 |
| tearing strength, transverse (N/cm) | 70 |

This textile tube was inserted into a PU-foil tube with 90 mm flat width, 100 Am thickness and the following mechanical properties:

| | |
|---|---|
| flexibility, longitudinal (%) | 270 |
| flexibility, transverse (%) | 460 |
| return, longitudinal (%) | 25 |
| return, transverse (%) | 40 |
| tearing strength, longitudinal (N/cm) | 53 |
| tearing strength, transverse (N/cm) | 51 |

The lining material obtained in this manner was impregnated with an epoxy composition (bis-phenol-A-epichlorohydrin resins, MW<700, hexanediol diglycidyl ether, N-aminoethyl piperazine, trimethyl hexamethylene diamine) in an amount of 1.5 kg/running meter. The spreading time of the resin composition amounted to ca. 20 min. at 10° C. and the curing time ca. 2 h. The impregnated lining material was pressed into a pipe with a nominal width of 100 mm having bends of 65 and/or 90° as well as inlet junction in the manner described above at an inversion pressure of 0.9 bar above atmospheric pressure. The curing of the resin occurred at a pressure of 0.6 bar above atmospheric pressure.

The thickness of the lining after curing amounted to 4.5 mm. Examination of the lining obtained gave the following results:

| | |
|---|---|
| peak compression strength (N/mm$^2$) | 84.5 |
| impermeability test | $^3$ 10 m WS |
| lining of the 65° bend | crease-free |
| lining of the 90° bend | crease-free |
| inlet | well recognizable |

EXAMPLE 2

A textile tube of polyester materials (core material PES high strength 550 dtex f96x1, loop material PES high strength 550 dtex f96x1 x2) in a right/left linkage was produced which had 158 rows of stitches/ per circumference and 58 RS/ 10 cm. It had a flat width of 150 mm, a wall thickness of 3.5 mm and a weight of 770 g/running meter. The mechanical properties were as follows:

| | |
|---|---|
| flexibility, longitudinal (%) | 25 |
| flexibility, transverse (%) | 82 |
| return, longitudinal (%) | 30 |
| return, transverse (%) | 30 |
| compressibility (%) | 40 |
| tearing strength, longitudinal (N/cm) | 110 |
| tearing strength, transverse (N/cm) | 80 |

This textile tube was vapor deposited with copper and was then inserted into a PU-foil tube with 135 mm flat width, 100 µm thickness and the following mechanical properties:

| | |
|---|---|
| flexibility, longitudinal (%) | 270 |
| flexibility, transverse (%) | 460 |
| return, longitudinal (%) | 25 |
| return, transverse (%) | 40 |
| tearing strength, longitudinal (N/cm) | 53 |
| tearing strength, transverse (N/cm) | 51 |

The lining material obtained in this manner was impregnated with an epoxy composition (Beckopox® EP 116, Vianova Resins, phenol-free amine curing agent Beckopox® VEH 2628) in an amount of 2.75 kg/running meter. The spreading time of the resin composition amounted to ca. 30 min. at 15° C. and the curing time ca. 2 h. The impregnated lining material was pressed into a pipe with a nominal width of 150 mm having bends of 65 and/or 90° as well as inlet junction in the manner described above at an inversion pressure of 1.0 bar above atmospheric pressure. The curing of the resin occurred at a pressure of 0.5 bar above atmospheric pressure.

The thickness of the lining after curing amounted to 4.0 mm. Examination of the lining obtained gave the following results:

| | |
|---|---|
| peak compression strength (N/mm$^2$) | 78.8 |
| impermeability test | $^3$ 8 m WS |
| lining of the 65° bend | crease-free |
| lining of the 90° bend | crease-free |
| inlet | well recognizable |

EXAMPLE 3

A textile tube of polyester materials (core material 80 dtex PU+200 dtex aramide 1x, loop material 167 dtex f30x2, PES-textured, 1000 dtex PES-staple fiber yarn) in a right/left linkage was produced which had 104 rows of stitches/per circumference and 50 RS/10 cm. It had a flat width of 100 mm, a wall thickness of 6.0 mm and a weight of 1200 g/running meter. The mechanical properties were as follows:

| | |
|---|---|
| flexibility, longitudinal (%) | 50 |
| flexibility, transverse (%) | 140 |
| return, longitudinal (%) | 95 |

-continued

| | |
|---|---|
| return, transverse (%) | 85 |
| compressibility (%) | 35 |
| tearing strength, longitudinal (N/cm) | 95 |
| tearing strength, transverse (N/cm) | 65 |

This textile tube was inserted into a PU-foil tube with 90 mm flat width, 150 μm thickness and the following mechanical properties:

| | |
|---|---|
| flexibility, longitudinal (%) | 240 |
| flexibility, transverse (%) | 360 |
| return, longitudinal (%) | 45 |
| return, transverse (%) | 40 |
| tearing strength, longitudinal (N/cm) | 65 |
| tearing strength, transverse (N/cm) | 55 |

The lining material obtained in this manner was impregnated with an epoxy composition (Beckopox® EP 116, Vianova Resins, phenol-free amine curing agent Beckopox® VEH 2628) in an amount of 1.5 kg/running meter. The spreading time of the resin composition amounted to ca. 20 min. at 10° C. and the curing time ca. 2 h. The impregnated lining material was pressed into a pipe with a nominal width of 100 mm having bends of 65 and/or 90° as well as inlet junction in the manner described above at an inversion pressure of 0.9 bar above atmospheric pressure. The curing of the resin occurred at a pressure of 0.6 bar above atmospheric pressure.

The thickness of the lining after curing amounted to 4.5 mm. Examination of the lining obtained gave the following results:

| | |
|---|---|
| peak compression strength (N/mm$^2$) | 84.5 |
| impermeability test | $^3$ 10 m WS |
| lining of the 65° bend | crease-free |
| lining of the 90° bend | distance from the pipe wall in the bend 1 cm, crease-free |
| inlet | well recognizable |

What is claimed is:

1. A lining material comprising a seamless plush textile tube and a plastic film layer coaxially and freely arranged around said seamless plush textile tube.

2. A lining material according to claim 1, wherein the plush textile tube comprises fibers of materials selected from group consisting of polyester, polyester (high strength), aramide, polyamide, polyurethane and glass and fibers consisting of mixtures of these materials.

3. A lining material according to claim 1, wherein the plush textile tube possesses a flexibility in the longitudinal direction of about 10 to about 70% and in the transverse direction of about 50 to about 200%.

4. A lining material according to claim 1, wherein the elastic portion of the flexibility of the plush textile tube amounts to about 60% or less expressed as the return according to DIN 61632 (German Industry Norm).

5. A lining material according to claim 1, wherein the plush textile tube posses a compressibility which corresponds to a reduction of the thickness of an individual plush textile layer by about 5 to about 60% of the original thickness when exposed to a compression force of about 0.4 to about 0.8 bar between two rigid surfaces.

6. A lining material according to claim 1, wherein the plush textile tube has a material distribution between the core fibers of the ware and the loop fibers (according to weight) in the range of about 1:99 to about 25:75.

7. A lining material according to claim 1, wherein the plush textile tube has about 30 to about 80 rows of stitches/ 10 cm.

8. A lining material according to claim 1, wherein the plush textile tube is arranged such that the plush loops are directed into the interior of the plush textile tube.

9. A lining material according to claim 1, wherein the plastic film layer is a polymer selected from the group consisting of polyester, silicone, polyethylene, polyurethane and polyester urethane.

10. A lining material according to claim 1, wherein the force which is required for expansion of the foil tube in the longitudinal as well as the transverse direction by about 40% does not exceed an amount of about 10 N/cm.

11. A lining material according to claim 1, wherein the elastic portion of the flexibility of the plastic film layer amounts to about 60% or less expressed as the return according to DIN 61632 (German Industry Norm).

12. A lining material according to claim 1, wherein the textile tube or the plastic film layer has a copper coating.

13. A lining material according to claim 1, wherein the textile tube and the plastic film layer has a copper coating.

14. A method for the production of a conduit and/or pipe lining comprising:
    a) impregnating a lining material comprising a seamless plush textile tube and a plastic film layer coaxially and freely arranged around said seamless plush textile tube in suitable length with a curable resin composition;
    b) introducing the impregnated lining material of step a) in an inversion pressure tube;
    c) pressing the arrangement of step b) into the conduit or pipe section to be lined by means of a pressure-driven inversion methods and
    d) curing the impregnation agent under maintenance of a pressure in the inversion tube which ensures the contact of the impregnated lining material to the wall of the conduit or pipe section.

15. A method according to claim 14, wherein a further preliner is introduced into the pipe section to be lined before carrying out the inversion step c).

16. A method according to claim 14, wherein the preliner has a copper coating.

17. A method according to claim 14, wherein the inversion method in step b) is carried out by applied pressure with air pressure.

18. A method according to claim 14, wherein the pressing of the lining material occurs with a positive pressure of about 0.4 to about 1.3 bar.

19. A method according to claim 14, wherein the curable resin composition comprisies a resin composition which is selected from cold-curing epoxide resins, cold-curing UP resins, light-curing UP resins, PU resins, polyester resins and vinylester resins.

20. A method according to claim 14, wherein further processing after curing occurs with the aid of a remote-controlled robot.

21. A conduit and/or pipe lining which comprises an inverted lining material having a seamless plush textile tube and a plastic film layer coaxially and freely arranged around said seamless plush textile tube including a plastic film layer and a seamless plush textile tube as well as a cured resin composition with which the plush textile tube is impregnated and onto which the plastic film layer adheres solidly and crease-free.

22. A conduit and/or pipe lining according to claim 21, wherein the cured resin is the curing product of a resin composition selected from cold-curing epoxide resins, cold-curing UP resins, light-curing UP resins, PU resins, polyester resins and vinylester resins.

23. A conduit and/or pipe lining which comprises an inverted lining material having a seamless plush textile tube and a elastic film layer coaxially and freely arranged around said seamless plush textile tube including a thin walled tube and a seamless plush textile tube as well as a cured resin composition with which the plush textile tube is impregnated and onto which the plastic film layer adheres solidly and crease-free obtainable according to a method which comprises:

a) impregnating a lining material comprising a seamless plush textile tube and a plastic film layer coaxially and freely arranged around said seamless plush textile tube in a suitable length with a curable resin composition;

b) introducing the impregnated lining material of step a) in an inversion pressure tube;

c) pressing the arrangement of step b) into the conduit or pipe section to be lined by means of a pressure-driven inversion method; and d) curing the impregnation agent under maintenance of a pressure in the inversion tube which ensures the contact of the impregnated lining material to the wall of the conduit or pipe section.

24. A conduit and/or pipe lining according to claim 23, wherein the cured resin is the curing product of a resin composition selected from cold-curing epoxide resins, cold-curing UP resins, light-curing UP resins, PU resins, polyester resins and vinylester resins.

* * * * *